United States Patent [19]

Shimazu et al.

[11] Patent Number: 4,836,631
[45] Date of Patent: Jun. 6, 1989

[54] LASER SCANNING MOTOR HAVING A ROTATING POLYGONAL MIRROR AND METHOD OF MANUFACTURING THE SAME

[75] Inventors: Kikuo Shimazu, Yokohama; Kazuo Suzuki, Ohtsu; Manabu Shiraki, Yamato; Osami Miyao, Sagamihara, all of Japan

[73] Assignees: Kanegafuchi Chemical Industry Co., Ltd., Osaka; Shicoh Engineering Co., Ltd., Yamato, both of Japan

[21] Appl. No.: 888,425

[22] Filed: Jul. 23, 1986

[30] Foreign Application Priority Data

Jul. 23, 1985 [JP] Japan .................................. 60-112741
Oct. 24, 1985 [JP] Japan .................................. 60-162137

[51] Int. Cl.$^4$ ...................... G02B 26/10; H02K 37/00
[52] U.S. Cl. ..................................... 350/6.8; 350/609;
310/46; 264/272.20
[58] Field of Search ................................. 350/6.5-6.8,
350/609; 310/36, 37, 43-46, 75 D, 90, 156, 157;
264/1.9, 262, 272.19, 272.2, 273

[56] References Cited

U.S. PATENT DOCUMENTS

| | | | |
|---|---|---|---|
| 2,988,456 | 6/1961 | Fairbanks et al. | 350/609 |
| 4,132,910 | 1/1979 | Kiss et al. | 310/44 |
| 4,141,620 | 2/1979 | Goshima et al. | 350/6.8 |
| 4,363,984 | 12/1982 | Torii et al. | 310/156 |
| 4,455,516 | 6/1984 | Furusho | 310/156 |
| 4,523,800 | 6/1985 | Yamashita et al. | 350/6.7 |
| 4,551,645 | 11/1985 | Takahashi et al. | 310/46 |
| 4,606,251 | 9/1986 | Nakaoka et al. | 350/6.8 |

FOREIGN PATENT DOCUMENTS 2824863 11/1979 Fed. Rep. of Germany .

OTHER PUBLICATIONS

Patent Abstracts of Japan, vol. 7, No. 216, Sep. 24, 1983 & JP-A-58 108 513.
Patent Abstracts of Japan, vol. 9, No. 89, Apr. 18, 1985 & JP-A-59 220 060.

Primary Examiner—John K. Corbin
Assistant Examiner—Loha Ben
Attorney, Agent, or Firm—Staas & Halsey

[57] ABSTRACT

A laser scanning motor includes a coreless flat brushless motor disposed in a rotatable polygonal mirror having polygonal outer mirror surfaces. A light beam applied to the polygonal mirror is deflected by controlling the rotation of the coreless flat brushless motor. Poles and a bearing holder of the coreless flat brushless motor in a rotor assembly are formed of a plastic magnetic material. When manufacturing the laser scanning motor, the poles and the bearing holder are formed simultaneously by filling the plastic magnetic material in one operation, and then firmly securing the poles and bearing holder to the rotor assembly.

20 Claims, 8 Drawing Sheets

LASER SCANNING MOTOR HAVING A ROTATING POLYGONAL MIRROR AND METHOD OF MANUFACTURING THE SAME

BACKGROUND OF THE INVENTION

1. Field of the Invention

The present invention relates to a laser scanning motor having a rotating polygonal mirror and a method of manufacturing the same, and more particularly to a laser scanning motor with a rotating polygonal mirror suitable for use in an image recording apparatus such as a facsimile receiver, a printer, or the like, and a method of manufacturing such a laser scanning motor.

2. Description of the Prior Art

It is well known in the art to record an information signal on a surface of a photosensitive body by deflecting a laser beam modulated by the information signal with a mirror or any other laser scanning motor to scan the photosensitive body with the information-modulated laser beam, or to read recorded information from such a photosensitive body by scanning the same with a laser beam and detecting the intensity of light reflected from the photosensitive body. Various laser scanning motors are known and used. One conventional laser scanning motor employs a rotating polygonal mirror, which can deflect a light beam continuously at a high speed for recording and reading information speedily and at a high packing density.

The prior laser scanning motor comprising such a rotating polygonal mirror typically uses a cylindrical brushless motor having salient poles and an iron core, the polygonal mirror being mounted on the rotatable shaft of the brushless motor. The laser scanning motor of this design is disadvantageous in that it is heavy, large in size, and has a relatively large thickness. Furthermore, the opposite ends of the rotatable shaft of the brushless motor are supported by respective bearings, which however cannot easily be brought into accurate axial alignment with each other. The above laser scanning motor is disclosed in Japanese Laid-Open Patent Publications Nos. 49(1974)-93027 and 57(1982)-62751.

SUMMARY OF THE INVENTION

It is an object of the present invention to provide a laser scanning motor having a rotating polygonal mirror, which is reduced in thickness in the direction of a rotatable shaft thereof.

Another object of the present invention is to provide a laser scanning motor having a rotating polygonal mirror that is rotatable as part of a motor of the laser scanning motor.

Still another object of the present invention is to provide a method of manufacturing a laser scanning motor having a rotating polygonal mirror, which is reduced in thickness in the direction of a rotatable shaft thereof.

A still further object of the present invention is to provide a method of manufacturing a light beam deflector having a rotating polygonal mirror that is rotatable as part of a motor of the laser scanning motor.

To achieve the above objects, there is provided a laser scanning motor including a rotatable polygonal mirror having a plurality of polygonal outer mirror surfaces for deflecting a light beam applied thereto, a coreless flat brushless motor disposed in the polygonal mirror, and control means for controlling the rotation of the coreless flat brushless motor.

According to the present invention, there is also provided a laser scanning motor including a rotor assembly including a main portion supporting on a side thereof a rotatable mirror for deflecting a light beam applied thereto, and brushless motor poles made of a plastic magnetic material and mounted in the main portion.

According to the present invention, there is also provided a laser scanning motor including a rotor assembly including a main portion supporting on a side thereof a rotatable mirror for deflecting a light beam applied thereto, stator coils, rotor magnetic poles of a permanent magnet made of a plastic magnetic material and mounted in the main portion in confronting relation to the stator coils, and a bearing made of a plastic magnetic material and joined to the magnetic poles centrally in the main portion.

According to the present invention, there is also provided a laser scanning motor including a base, a rotor assembly rotatably supported on the base and including a main portion supporting on a side thereof a rotatable mirror for deflecting a light beam applied thereto, the rotor assembly having a doughnut-shaped cavity defined axially thereof, rotor magnetic poles made of a plastic magnetic material and disposed on a side wall of the cavity with a rotor yoke therebetween, stator coils disposed in the cavity in confronting relation to the rotor magnetic poles, and a coil yoke disposed in confronting relation to the rotor magnetic poles with the stator coils disposed therebetween.

According to the present invention, there is further provided a method of manufacturing a laser scanning motor having a rotatable mirror for deflecting a light beam applied thereto, the method comprising the steps of defining a cavity in a disc-shaped metallic blank for receiving a field magnet, a through hole in the blank for receiving a bearing holder, and a material retaining portion in the blank for a material of the field magnet, thereafter, filling a plastic magnetic material in the cavity, the through hole, and the material retaining portion, while forming a bearing holder centrally in the cavity, and subsequently, forming the mirror on a side of the blank.

According to the present invention, there is further provided a method of manufacturing a laser scanning motor having a rotatable mirror for deflecting a light beam applied thereto, the method comprising the steps of defining a cavity in a disc-shaped metallic blank for receiving a field magnet, an annular recess outwardly of the cavity for receiving poles for detecting the position of a rotor assembly, a through hole in the blank for receiving a bearing holder, and a material retaining portion in the blank for a material of the field magnet, thereafter, filling a plastic magnetic material in the cavity, the annular recess, an outer circumferential portion of the through hole, and the material retaining portion, while forming a bearing holder centrally in the cavity, and subsequently, forming the mirror on a side of the blank.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
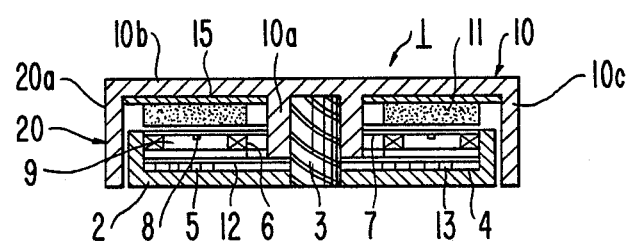
FIG. 1 is an axial cross-sectional view of a laser scanning motor according to a first embodiment of the present invention.
Figure 3:
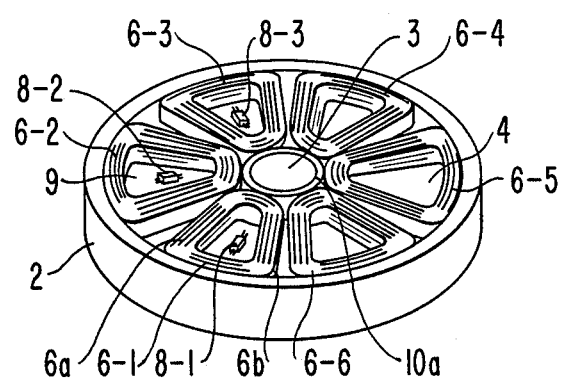
FIG. 3 is a perspective view of a group of armature coils.
Figure 2:
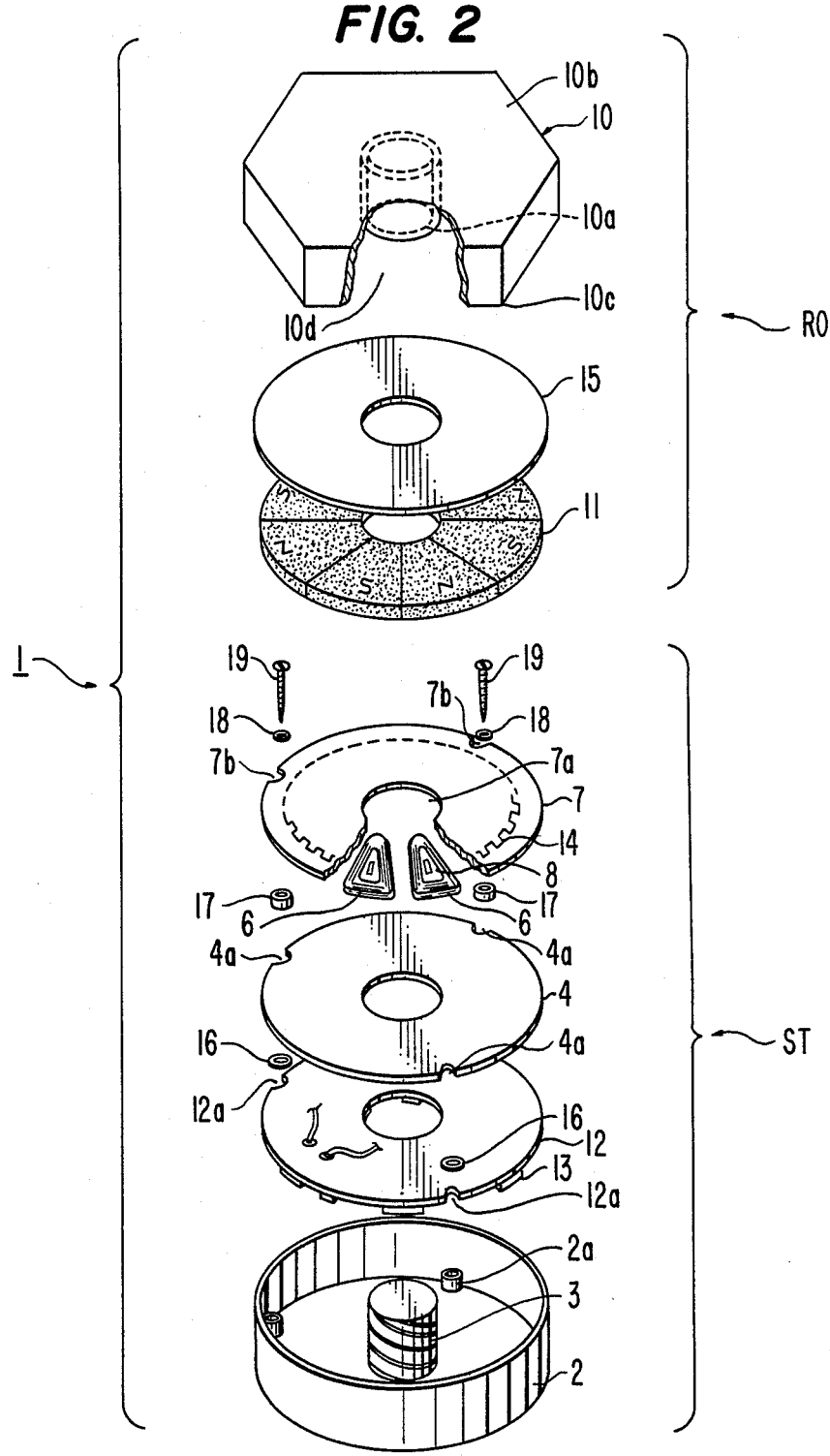
FIG. 2 is an exploded perspective view of the laser scanning motor shown in FIG. 1.

FIGS. 1 and 2 show a laser scanning motor according to a first embodiment of the present invention. The laser scanning motor, generally designated at 1, includes a flat cup-shaped support 2 in the form of a thin dish accommodating stator assembly components of the laser scanning motor, as described below. The support 2 may be made of aluminum or synthetic resin. A fixed vertical shaft 3 having a helical groove defined in an outer peripheral surface is mounted substantially centrally on the support 2. A stator yoke 4 comprising a soft iron sheet or a sheet of soft ferrite material is disposed in the support 2 and has upper and lower surfaces insulated, with a printed-circuit board 12 being attached to the lower surface thereof. Electric parts 13 (chip parts) constituting a conduction control circuit are disposed on the lower surface of the printed-circuit board 12, the electric parts having terminals connected by printed wires on the upper surface of the printed-circuit board 12. These electric parts 13 are accommodated in a clearance 5 which thus serves as a space for storing the conduction control circuit. Armature coils 6 wound in the pattern of frames are bonded by an adhesive to the lower surface of a printed-circuit board 7 which is placed on the upper surface of the stator yoke 4. FIG. 3 shows these armature coils 6 with the printed-circuit board 7 removed from the support 2. As shown in FIG. 3, there are six armature coils 6 positioned on the stator yoke 4 and extending regularly radially outwardly from the fixed shaft 3. These armature coils 6 have terminals coupled in a star connection on the lower surface of the printed-circuit board 7.

The printed-circuit board 7 has printed wires on both surfaces thereof, and includes a central through hole 7a. The printed-circuit board 7 bears on its upper surface a zigzag conductive pattern 14 for detecting the rotational speed of a member 10 of a rotor assembly which doubles as a holder for a field magnet and a rotatable polygonal mirror, as described later. As described above, the printed wires on the lower surface of the printed-circuit board 7 connect the armature coils 6.

Magnetoelectric transducers 8 are mounted on the lower surface of the printed-circuit board 7 and positioned in frame cavities 7 of the armature coils 6. These magnetoelectric transducers 8 may comprise Hall-effect devices or Hall-effect ICs and serve as a position detector element of a detector for detecting the rotational position of a rotor assembly, described later. The positions in which the magnetoelectric transducers 8 are located will be described later in detail.

The flat cup-shaped support 2, the fixed shaft 3, the printed-circuit board 12, the stator yoke 4, the printed-circuit board 7, the armature coils 6, and the magnetoelectric transducers 8 jointly constitute a stator assembly ST, as shown in FIG. 2, and are put together as follows: The printed-circuit board 12 is fitted in the flat cup-shaped support 2 with fixed teeth 2a on an inner surface of the support 2 being received respectively in recesses 12a defined in an outer peripheral edge of the printed-circuit board 12. Spacers 16 are positioned over the respective recesses 12a, and the stator yoke 4 is thereafter placed on the spacers 16, with recesses 4a defined in an outer peripheral edge of the stator yoke 4 being aligned with the recesses 2a, respectively. Spacers 17 are then positioned over the respective recesses 4a, followed by placing the printed-circuit board 7 on the spacers 17 which has recesses 7b defined in an outer peripheral edge thereof and positioned in alignment with the recesses 4a, respectively. Screws 19 with washers 18 are inserted through the spacers 17, 16 threadedly into the fixed teeth 2a across the printed-circuit board 7, the stator yoke 4, and the printed-circuit board 12, thus fastening them together and to the support 2, whereupon the stator assembly ST is completed.

The member 10 is in the form of a shallow cup comprising a cylindrical bearing 10a rotatably fitted over the fixed shaft 3, a flange 10b integrally extending radially outwardly from the cylindrical bearing 10a, and a vertical portion 10c extending vertically downwardly from the outer peripheral edge of the flange 10b. The vertical portion 10c is composed of hexagonal sides having outer surfaces coated with reflecting films formed by vapor deposition or the like, thus providing a rotatable polygonal mirror 20 on the outer periphery of the member 10. The rotatable polygonal mirror 20 has reflecting surfaces 20a. Where the member 10 is made of aluminum, the reflecting surfaces 20a may be formed by cutting or grinding the outer surfaces of the hexagonal vertical portion 10c.

A rotor yoke 15 comprises a soft iron sheet or a sheet of soft ferrite material and is disposed in a cavity 10d defined by the member 10. The rotor yoke 15 is fixed to the lower surface of the flange 10b. An annular field magnet 11 is secured to the lower surface of the rotor yoke 15. The member 10, the rotor yoke 15, and the field magnet 11 jointly constitute a rotor assembly RO, which is placed over the stator assembly ST with the fixed shaft 3 of the stator assembly ST being rotatably fitted in the cylindrical bearing 10a of the rotor assembly RO. The rotor assembly RO is therefore rotatably supported on the stator assembly ST. The length of the reflecting surfaces 10a along the fixed shaft 3 is such that they substantially surround the support 2. Accordingly, the stator assembly ST is covered fully by the rotor assembly RO. With the rotor assembly RO and the stator assembly ST thus combined, the printed-circuit board 7 confronts the field magnet 11 with a small clearance left therebetween.

Figure 4:
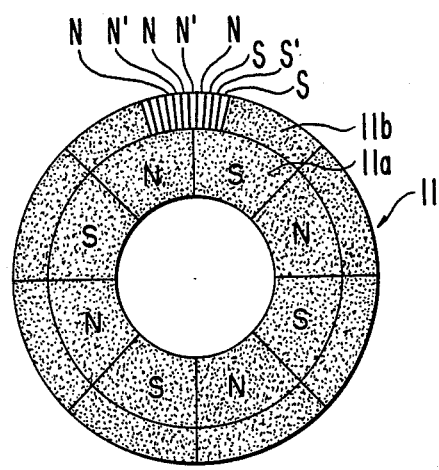
FIG. 4 is a plan view of an arrangement of field magnet poles.
Figure 5:
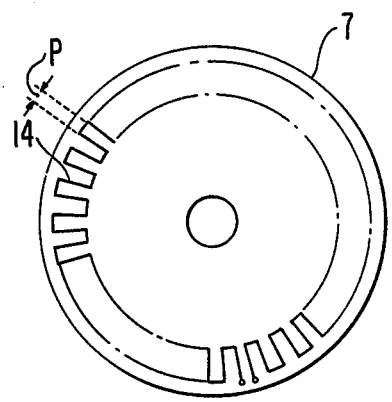
FIG. 5 is a plan view of a printed-circuit board having a conductive pattern.

As shown in FIG. 4, the field magnet 11 has on its lower surface eight main magnetic poles 11a magnetized as alternate N and S poles, and about 180 frequency-detecting magnetic poles 11b as N, N', S, S' poles disposed around the main magnetic poles 11a for detecting the speed of rotation of the rotor assembly RO. The N and S poles are magnetized more strongly than the N' and S' poles. These frequency-detecting magnetic poles 11b confront the zigzag or sawtooth conductive pattern (FG pattern) 14 on the printed-circuit board 7 as shown in FIG. 5. The frequency-detecting magnetic poles 11b and the conductive pattern 14 jointly form a frequency generator. To produce the field magnet 11 as shown in FIG. 4, the main magnetic poles 11a may first be magnetized by a suitable magnetizer (not shown), and then the frequency-detecting magnetic poles 11b may be magnetized by a dedicated magnetizer (not shown) relatively weakly.

Figure 6:
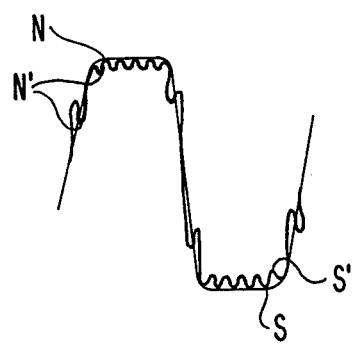
FIG. 6 is a diagram showing the waveform of a gap flux density formed when the field magnet of FIG. 4 is rotated.

The field magnet 11 thus constructed will produce a magnetic flux across the gap between the field magnet 11 and the printed-circuit board 7, the flux having a density as shown in FIG. 6. FIG. 6 indicates that the magnetic flux density formed by the frequency-detecting magnetic poles 11b are added to the magnetic flux density formed by the main magnetic poles 11a, resulting in small waves on each of the maximum and minimum levels of the waveform of the flux density produced by the main magnetic poles 11a.

The conductive pattern 14 on the printed-circuit board 7 along the outer peripheral edge thereof has a pitch P (FIG. 5) that is identical to the pitch of the frequency-detecting magnetic poles 11b. When every other radial segments of the conductive pattern 14 confront the N or S poles of the frequency-detecting magnetic poles 11b, the other intermediate radial segments of the conductive pattern 14 confront the N' or S' poles of the frequency-detecting magnetic poles 11b. Thus, electromotive forces are induced in one direction on the segments according to the speed of rotation of the frequency-detecting magnetic poles 11b, so that a detected output having a frequency dependent on the speed of rotation of the rotor assembly RO will be produced at output terminals (not shown) of the conductive pattern 14.

While pulsed magnetic fluxes are produced intermittently by the frequency-detecting magnetic poles 11b, the detected output is of a continuous waveform since the conductive pattern 14 is formed fully along the peripheral edge of the printed-circuit board 7 as shown in FIG. 5. Even if the frequency-detecting magnetic poles 11b have irregular pitches, such irregular pitches are actually smoothed by the plural segments of the conductive pattern 14. Therefore, when the rotor assembly RO rotates at a constant speed, the detected output has a constant frequency. Any change in the rotational speed of the rotor assembly is detected as a modulated component of the frequency of the detected output.

Therefore, a coreless flat brushless motor constructed of the stator and rotor assemblies ST, RO can be controlled to rotate at a constant speed by a signal from the frequency generator composed of the frequency-detecting magnetic poles 11b and the conductive pattern 14. As a result, the rotatable polygonal mirror 20 can deflect a light beam applied thereto for allowing a desired surface to be scanned accurately with the deflected light beam.

FIG. 3 shows in perspective the configurations of the armature coils 6 and the manner in which they are arranged. The armature coils 6 include six armature coils 6-1 through 6-6 wound as sectorial frames and angularly spaced at equal intervals so that they are not overlapped. The magnetoelectric transducers 8 include three magnetoelectric transducers 8-1, 8-2, 8-3 disposed in spaces 9 defined in the three armature coils 6-1 through 6-3, respectively, as described in greater detail below with reference to FIG. 7.

Figure 7:
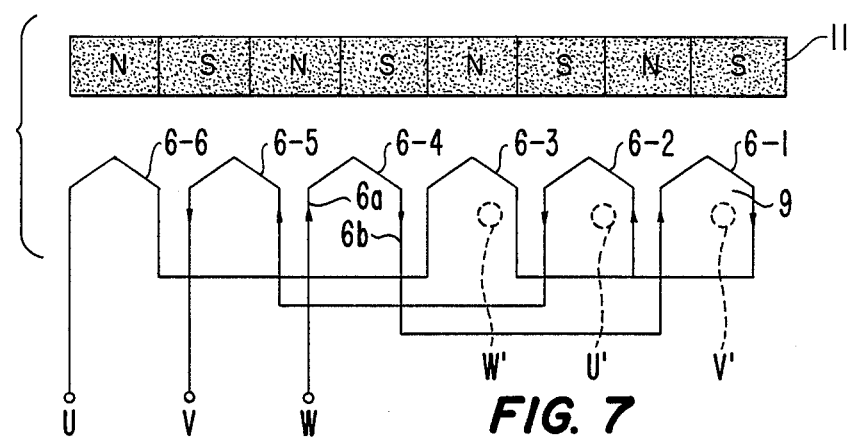
FIG. 7 is a developed view of the field magnet and the armature coils.

FIG. 7 shows in developed diagram the field magnet 11 and the armature coils 6, the view also showing the locations where the magnetoelectric transducers 8 are disposed.

As illustrated in FIG. 7, each of the armature coils 6 has radial conductor portions 6a, 6b for generating a torque are spaced an angular interval which is about $2n-1$ times ($n=1$ in the illustrated embodiment) the pole width of the field magnet 11, i.e., which is substantially equal to the pole width of the field magnet 11. As shown in FIGS. 3 and 7, the armature coils 6 are equally spaced without being overlapped. The armature coils 6 are paired such that two armature coils in each pair are electrically in phase with each other and physically 80° out of phase with each other in the circumferential direction, and there are three such pairs. More specifically, the armature coils 6-1, 6-4 are paired, the armature coils 6-2, 6-5 are paired, and the armature coils 6-3, 6-6 are paired. The magnetoelectric transducers 8-1, 8-2, 8-3 are disposed in the respective pairs of the armature coils 6, and accommodated in the respective spaces 9 of the armature coils 6.

As shown in FIG. 7, the magnetoelectric transducers 8 to be disposed at positions U, V, W on the conductor portions 6 of the armature coils 6-4, 6-5, 6-6 which produce a torque are disposed at equivalent positions V', U', W' in the spaces 9 of the armature coils 6-1, 6-2, 6-3.

The coreless flat brushless motor is composed of the field magnet 11, the armature coils 6-1 through 6-6, and the magnetoelectric transducers 8-1 through 8-3.

Figure 8:
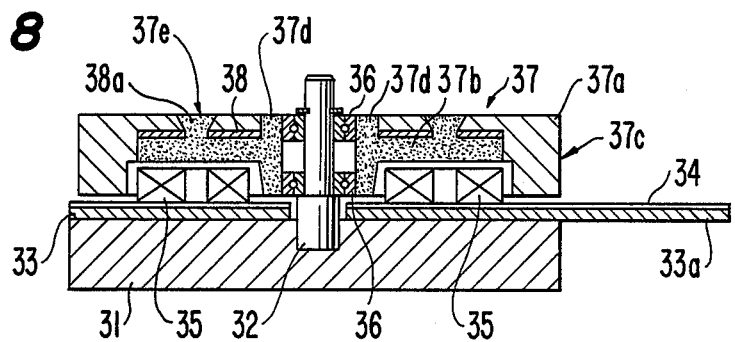
FIG. 8 is an axial cross-sectional view of a laser scanning motor according to a second embodiment of the present invention.

A laser scanning motor having a rotatable polygonal mirror according to a second embodiment will be described below with reference to FIG. 8. The laser scanning motor of the second embodiment includes a base 31 made of aluminum in the form of a relatively thick circular plate having a central shaft 32 of iron. A yoke plate 33 made of a ferromagnetic material such as soft iron is bonded by an adhesive to the base 31 and has a terminal plate 33a projecting laterally therefrom. Therefore, the yoke plate 33 is somewhat spoon-shaped. The yoke plate 33 has an upper surface on which a thin insulating layer such as a thin synthetic resin film is placed or which is coated with a thin insulating layer such as of synthetic resin such as epoxy resin. A printed-circuit board 34 of a predetermined printed wire pattern is placed on the yoke plate 33 and has a terminal section positioned on the terminal plate 33a. A plurality of stator coils 35 are bonded to the upper surface of the printed-circuit board 34 around the shaft 32 and have terminals (not shown) connected to the printed wire pattern on the printed-circuit board 34.

A rotor assembly 37 is rotatably mounted on the shaft 32 by two bearings 36. The rotor assembly 37 comprises a main portion 37a formed of aluminum and a central magnetized portion 37b having rotor poles. The main portion 37a has on its side eight mirrors 37c arranged in an octagonal form. The magnetized portion 37b comprises a plastic magnetic material formed of synthetic resin with magnetic powder mixed therein, and is magnetized as alternate N and S poles circumferentially around the shaft 32 and confronting the stator coils 35. The magnetized portion 37b has a central bearing holder 37d made of the same plastic magnet material as that of the magnetized portion 37b. The bearings 36 have outer races fitted in the central bearing holder 37d. A yoke plate 38 made of soft iron is mounted on the magnetized portion 37b. The yoke plate 38 is fixed in place by plastic magnetic masses which flow into conical holes 37e defined in the upper surface of the rotor assembly 37 through small holes 38a defined in the yoke plate 38 when the magnetized portion 37b is injection-molded in the main portion 37a of the rotor assembly 37.

In operation, a polyphase alternating current generated by a semiconductor device (not shown) is supplied to the stator coils 35 to generate a revolving magnetic field around the shaft 32. The magnetized portion 37b of the rotor assembly 37 coacts with the revolving magnetic field to rotate the rotor assembly 37. Such rotation of the rotor assembly 37 is detected by a known position signal generator and delivered to a control unit (not shown) as a position signal indicating that the rotor assembly 37 rotates at a certain speed, or as a rotational direction signal. Such a control system will not be described in detail since its nature is well known in the art. Where the polygonal mirror device of FIG. 8 is employed in a laser printer, a modulated laser beam is applied to the mirror 37c of the rotating rotor assembly 37 and reflected thereby to scan a photosensitive drum (not shown) for forming a latent image thereon.

Figure 9:
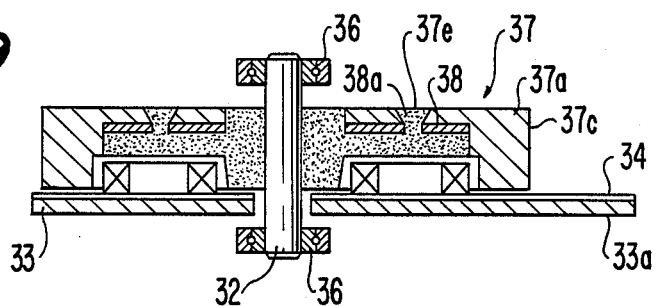
FIG. 9 is an axial cross-sectional view of a laser scanning motor according to a third embodiment of the present invention.

FIG. 9 shows a laser scanning motor having a rotatable polygonal mirror according to a third embodiment. The laser scanning motor of the third embodiment is substantially similar to that of the second embodiment except that the shaft 32 is rotatable with the rotor assembly 37 and force-fitted in the magnetized portion 37b which is formed of a plastic magnet material. The rotor assembly 37 is rotatably supported by two bearings 36 that are mounted on a case (not shown). Operation of the third embodiment will not be described as it is the same as that of the second embodiment.

Figure 10:
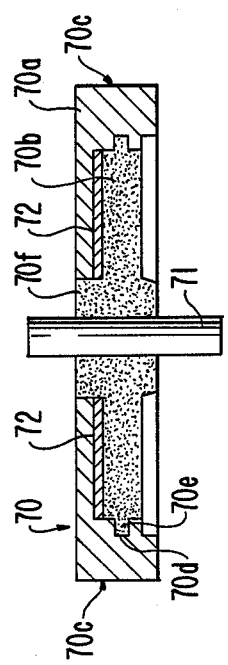
FIG. 10 is an axial cross-sectional view of a laser scanning motor according to a fourth embodiment of the present invention.

FIG. 10 is illustrative of a rotor assembly of a laser scanning motor according to a fourth embodiment of the present invention. A rotor assembly 70 comprises a main portion 70a made of aluminum and a magnetized portion 70b. The main portion 70a, has on its side eight mirrors 70c arranged as an octagonal shape. The magnetized portion 70b is made of a plastic magnetic material composed of synthetic resin and magnetic powder mixed therein. Although not shown, the magnetized portion 70b has alternate N and S poles magnetized around a shaft 71 in confronting relation to stator coils (not shown) disposed below the rotor assembly 70. A yoke 72 in the form of a circular plate made of soft iron is fitted in the main portion 70a. The magnetized portion 70b includes an outer ridge 70e fitted snugly in a groove 70d defined fully circumferentially in the inner surface of the main portion 70a. Therefore, the magnetized portion 70b and the main portion 70a are firmly assembled together with the yoke 72 sandwiched therebetween. The magnetized portion 70b has a polygonal neck 70f snugly fitted in the main portion 70a so that the magnetized portion 70b and the main portion 70a will not be disassembled and rotated separately.

Figure 11:
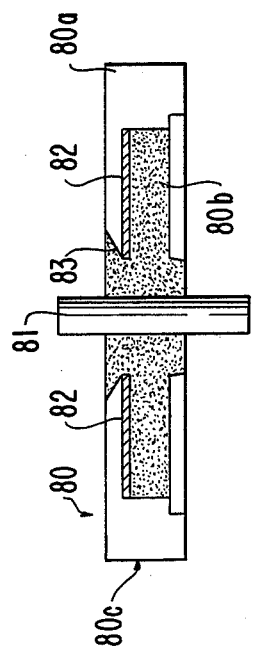
FIG. 11 is an axial cross-sectional view of a laser scanning motor according to a fifth embodiment of the present invention.

FIG. 11 shows a rotor assembly of a laser scanning motor according to a fifth embodiment of the present invention. A rotor assembly 80 comprises a main portion 80a made of aluminum and a magnetized portion 80b. The main portion 80a has on its side eight mirrors 80c arranged as an octagonal shape. The magnetized portion 80b is made of a plastic magnetic material composed of synthetic resin and magnetic powder mixed therein. Although not shown, the magnetized portion 80b has alternate N and S poles magnetized around a shaft 81 in confronting relation to stator coils (not shown) disposed below the rotor assembly 80. A yoke 82 in the form of a circular plate made of soft iron is fitted in the main portion 80a. When the magnetized portion 80b is injection-molded in the main portion 80a, it is also filled in an upwardly opening inverted pyramidal recess 83 defined in the main portion 80a. The magnetized portion 80b is thus firmly attached to the main portion 80a through this filled portion while sandwiching the yoke 82 between the main portion 80a and the magnetized portion 80b. Since the recess 83 is of an inverted pyramidal shape, the main portion 80a and the magnetized portion 80b are prevented from being separated and rotated independently of each other.

Figure 12:
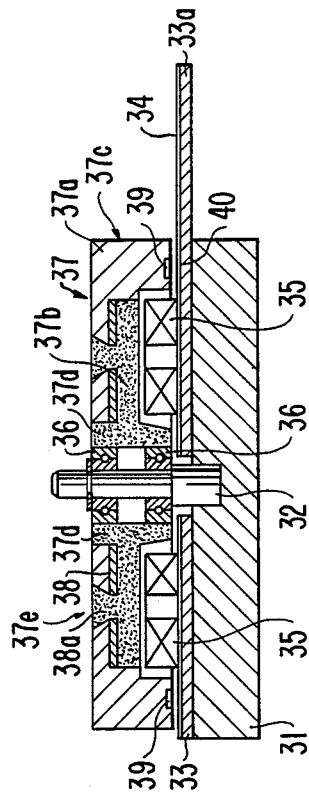
FIG. 12 is an axial cross-sectional view of a laser scanning motor according to a sixth embodiment of the present invention.

A laser scanning motor having a rotatable polygonal mirror according to a sixth embodiment will be described below with reference to FIG. 12. Since the sixth embodiment is substantially identical to the second embodiment, those parts of the sixth embodiment which are identical to those of the second embodiment are denoted by identical reference characters. The laser scanning motor of the second embodiment includes a base 31 made of aluminum in the form of a relatively thick circular plate having a central shaft 32 of iron. A yoke plate 33 made of a ferromagnetic material such as soft iron is bonded by an adhesive to the base 31 and has a terminal plate 33a projecting laterally therefrom. Therefore, the yoke plate 33 is somewhat spoon-shaped. The yoke plate 33 has an upper surface on which a thin insulating layer such as a thin synthetic resin film is placed or which is coated with a thin insulating layer such as of synthetic resin such as epoxy resin. A printed-circuit board 34 of a predetermined printed wire pattern is placed on the yoke plate 33 and has a terminal section positioned on the terminal plate 33a. A plurality of stator coils 35 are bonded to the upper surface of the printed-circuit board 34 around the shaft 32 and have terminals (not shown) connected to the printed wire pattern on the printed-circuit board 34.

A rotor assembly 37 is rotatably mounted on the shaft 32 by two bearings 36. The rotor assembly 37 comprises a main portion 37a formed of aluminum and a central magnetized portion 37b having rotor poles. The main portion 37a has on its side eight mirrors 37c arranged in an octagonal form. The magnetized portion 37b is made of a plastic magnetic material composed of synthetic resin with magnetic powder mixed therein, and is magnetized as alternate N and S poles circumferentially around the shaft 32 and confronting the stator coils 35. The magnetized portion 37b has a central bearing holder 37d made of the same plastic magnetic material as that of the magnetized portion 37b. The bearings 36 have outer races fitted in the central bearing holder 37d. A yoke plate 38 made of soft iron is mounted on the magnetized portion 37b. The yoke plate 38 is fixed in place by plastic magnetic masses which flow into conical holes 37e defined in the upper surface of the rotor assembly 37 through small holes 38a defined in the yoke plate 38 when the magnetized portion 37b is injection-molded in the main portion 37a of the rotor assembly 37.

In operation, a polyphase alternating current generated by a semiconductor device (not shown) is supplied to the stator coils 35 to generate a revolving magnetic field around the shaft 32. The magnetized portion 37b of the rotor assembly 37 interacts with the revolving magnetic field to rotate the rotor assembly 37. A speed signal generator 39 is disposed on the lower surface of the main portion 37a. The speed signal generator 39 is made of a plastic magnetic material magnetized as alternate N and S poles and filled in a shallow annular groove defined fully circumferentially in the lower surface of the main portion 37a which is made of aluminum. The printed-circuit board 34 below the speed signal generator 39 has a detector 40 in the form of a zigzag printed wire corresponding to the magnetized poles of the speed signal generator 39. The zigzag segments of the detector 40 are connected in series. When the rotor assembly 37 is rotated, magnetic fluxes generated by the poles of the speed signal generator 39 cross the conductor of the printed wire of the detector 40, enabling the detector 40 to produce a signal for detecting the speed of rotation of the rotor assembly 37. The signal thus detected by the detector 40 is delivered to a control unit (not shown) as a rotation control signal for the rotor assembly 37. Such a control system will not be described in detail since its nature is well known in the art. Where the polygonal mirror device of FIG. 12 is employed in a laser printer, a modulated laser beam is applied to the mirror 37c of the rotating rotor assembly 37 and reflected thereby to scan a photosensitive drum (not shown) for forming a latent image thereon.

Figure 13:
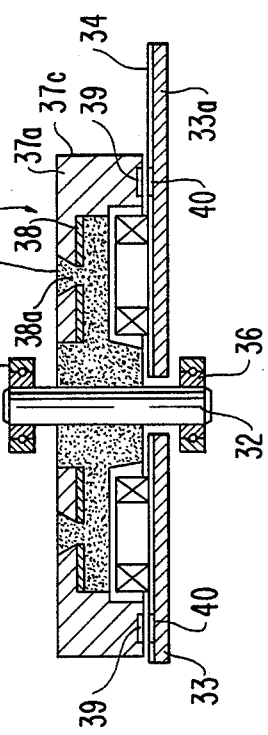
FIG. 13 is an axial cross-sectional view of a laser scanning motor according to a seventh embodiment of the present invention.

FIG. 13 shows a laser scanning motor having a rotatable polygonal mirror according to a seventh embodiment. Since the seventh embodiment is substantially identical to the sixth embodiment, those parts of the seventh embodiment which are identical to those of the sixth embodiment are denoted by identical reference characters. The shaft 32 is rotatable with the rotor assembly 37 and force-fitted in the magnetized portion 37b, which is formed of a plastic magnetic material. The rotor assembly 37 is rotatably supported by two bearings 36 that are mounted on a case (not shown). Operation of this embodiment will not be described as it is the same as that of the sixth embodiment. Although the shaft 32 is forcefitted in place after the magnetized portion 37b has been injection-molded in the illustrated embodiment, the shaft 32 may be secured to the magnetized portion 37b when the latter is injection-molded.

Figure 14:
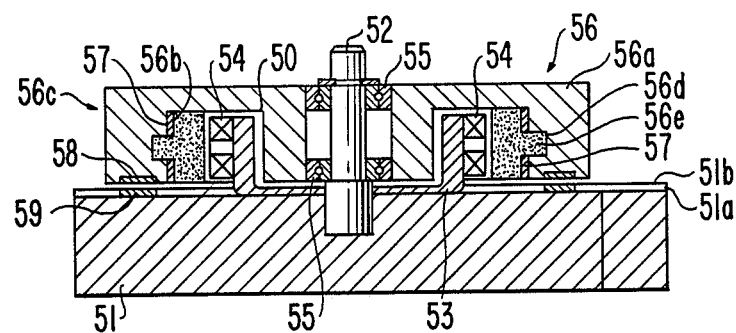
FIG. 14 is an axial cross-sectional view of a laser scanning motor according to an eighth embodiment of the present invention.
Figure 15:
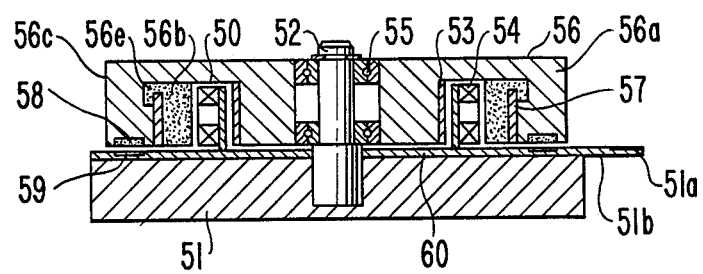
FIG. 15 is an axial cross-sectional view of a laser scanning motor according to a ninth embodiment of the present invention.

Eighth and ninth embodiments of the present invention will be described below in detail. FIGS. 14 and 15 illustrate these embodiments, respectively, and FIGS. 16 and 17 fragmentarily show rotor assemblies of these embodiments, respectively, as they are being manufactured. In each of these embodiments, the laser scanning motor includes a base 51 made of metal or synthetic resin in the form of a relatively thick circular plate having a central shaft 52 of iron. The base 51 has an upper surface on which a thin insulating layer such as a thin synthetic resin film is placed or which is coated with a thin insulating layer such as of synthetic resin such as epoxy resin. A printed-circuit board 51b of a predetermined printed wire pattern is placed on the insulating layer and has a terminal section 51a.

A rotor assembly 56 is rotatably mounted on the shaft 52 by two bearings 55. The rotor assembly 56 comprises a main portion 56a formed of aluminum and a central magnetized portion 56b. The main portion 56a has on its side eight mirrors 56c arranged in an octagonal form. The rotor assembly 56 has a doughnut-shaped cavity 50 defined in the lower surface thereof, and the magnetized portion 56b is disposed on a side wall of the cavity 50. The magnetized portion 56b is made of a plastic magnetic material composed of synthetic resin such as nylon with magnetic powder mixed therein, and is magnetized as alternate N and S poles circumferentially around the shaft 52 and confronting stator coils 54, the poles of the magnetized portion 56b serving as rotor poles.

A speed signal generator 58 is disposed on the lower surface of the main portion 56a. The speed signal generator 58 is made of a plastic magnet material magnetized as alternate N and S poles and filled in a shallow annular groove 58a defined fully circumferentially in the lower surface of the main portion 56a which is made of aluminum. The printed-circuit board 52 below the speed signal generator 58 has a detector 59 in the form of a zigzag printed wire corresponding to the magnetized poles of the speed signal generator 58. The zigzag segments of the detector 59 are connected in series. When the rotor assembly 56 is rotated, magnetic fluxes generated by the poles of the speed signal generator 58 cross the conductor of the printed wire of the detector 59, enabling the detector 59 to produce a signal for detecting the speed of rotation of the rotor assembly 56. A mechanism for detecting the speed of rotation of the rotor assembly 56 will not be described in detail since its nature is well known in the art.

In the embodiment of FIG. 14, a cup-shaped yoke 53 made of a ferromagnetic material such as soft iron is secured centrally to the upper surface of the base 51. A plurality of stator coils 54 are attached to the outer circumferential surface of the yoke 53 and have terminals (not shown) connected to the printed wire pattern of the printed-circuit board 51b.

The magnetized portion 56b is formed by injection molding. When the melted plastic magnetic material flows into the cavity 50, it partly goes through holes 57a (FIG. 16) defined in an annular yoke 57 made of a ferromagnetic material such soft iron into a channel-shaped groove 56d defined in the inner surface of the main portion 56a. The plastic magnetic material filling the groove 56d serves as a joint 56e by which the annular yoke 57 is firmly secured to the main portion 56a.

The mirrors 56c are formed by cutting or grinding the main portion 56a after the magnetized portion 56b has been formed.

In the embodiment of FIG. 15, a cup-shaped coil holder 60 made of synthetic resin such as epoxy resin is secured centrally to the upper surface of the base 51. A plurality of stator coils 54 are attached to the outer circumferential surface of the coil holder 60 and have terminals (not shown) connected to the printed wire pattern of the printed-circuit board 51b.

Figure 16:
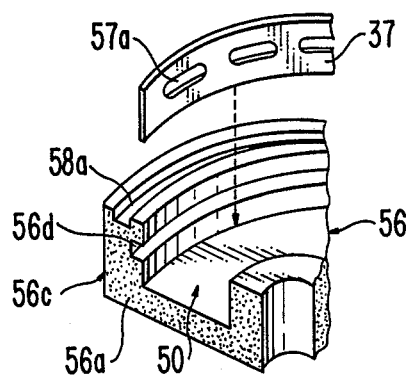
FIGS. 16 and 17 are fragmentary perspective views showing processes of manufacturing the laser scanning motors of the eighth and ninth embodiments of the present invention.
Figure 17:
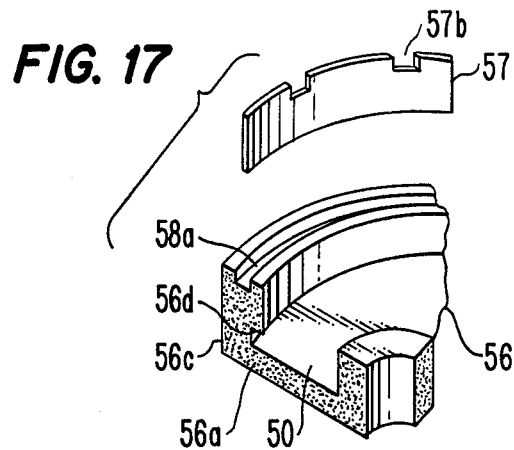

The magnetized portion 56b is formed by injection molding in the same manner as that of the embodiment of FIG. 14. The melted plastic magnetic material flows through recesses 57b (FIG. 17) defined in an annular yoke 57 made of a ferromagnetic material such soft iron into a groove 56d defined in the inner surface of the main portion 56a. the plastic magnetic material filling the groove 56d serves as a joint 56e by which the annular yoke 57 is firmly secured to the main portion 56a.

Where the yoke 57 and the main portion 56a are joined to each other by the plastic magnetic material in the injection molding process, the height of the yoke 57 may be reduced to allow the plastic magnetic material to leak into the main portion 56a, rather than providing the holes 57a or the recesses 57b in the yoke 57 as shown in FIGS. 16 and 17.

The groove 56d defined in the main portion 56a may be wedge-shaped in cross section so that it is spread radially outwardly for fixing the yoke 57 to the main portion 56a more securely. However, since the plastic magnetic material is injected under high pressure, the joining strength may practically be sufficient even if the groove 56d is replaced with discrete depressions or knurled recesses.

In FIG. 15, a annular yoke 53 made of a ferromagnetic material such as soft iron is disposed in confronting relation to the magnetized portion 56b with the stator coils 54 interposed therebetween, and is secured to the rotor assembly 56 in concentric relation to the stator coils 54 and the magnetized portion 56b.

The yoke 57, the magnetized portion 56b, and the yoke 53 jointly form a magnetic circuit which applies a magnetic field to the stator coils 54 positioned between the magnetized portion 56b and the yoke 53. Therefore, when a polyphase alternating current generated by a converter comprising a semiconductor device is supplied to the stator coils 54 to generate a revolving magnetic field around the shaft 52, this revolving magnetic field and the magnetic field from the magnetized portion 56b interact to produce a revolving magnetic field to enable the rotor assembly 56 to rotate and hence the mirrors thereon to rotate therewith.

Such rotation is detected by the speed signal generator, and a detected signal is fed to the control system as a speed signal for controlling the rotor assembly 56 to rotate at a prescribed speed. In case the polygonal mirror device of FIGS. 14 and 15 is employed in a laser printer, a modulated laser beam is applied to the mirror 56c of the rotating rotor assembly 56 and reflected thereby to scan a photosensitive drum (not shown) for forming a latent image thereon.

Although the yoke 53 in the embodiment of FIG. 14 is secured to the base 51, the yoke 53 in the embodiment of FIG. 15 is secured to the rotor assembly 56.

According to the embodiment of FIG. 15, therefore, the yoke is rotatable with the rotor poles, so that eddy currents produced on the yoke can be reduced, resulting in a more efficient motor than that of FIG. 14.

A method of manufacturing the laser scanning motor according to the sixth and seventh embodiments will be described below.

Figure 18:
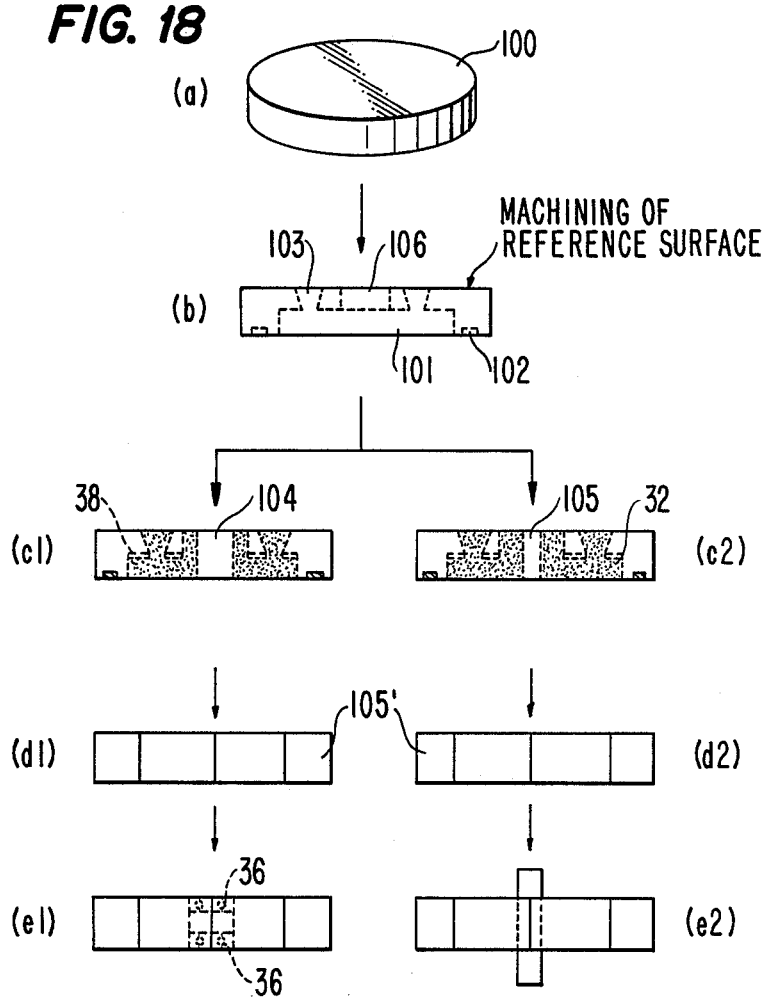
FIG. 18 is a flowchart illustrative of a method according to the present invention.

As shown in FIG. 18, a disc-shaped blank 100 cut off from an aluminum cylinder is provided in a step (a).

In a next step (b), the upper surface of the blank 100 is machined to produce a reference surface to which a rotatable shaft will be normal. Then, the lower surface is machined, and a cavity 101 and a through hole 106 are bored in the blank 100 for receiving the magnetized portion 37b and the bearing holder 37d. A shallow recess 102 for receiving the speed signal generator 39 is defined as an annular groove fully circumferentially in the lower surface of the mail portion 37a. Eight small conical holes 103 are formed in the upper surface of the blank 100 which reach the bored cavity 101, the holes 103 being equally angularly spaced.

Then, there are first and second manufacturing processes available. The first process will first be described.

In a step (c1), an annular yoke plate 38 is inserted into the cavity 101 and held against the bottom thereof with small holes in the yoke plate 38 being held in registry with the holes 103, respectively. Thereafter, a plastic magnetic material with magnetic powder mixed therein is filled in the cavity 101, the shallow recess 102, and the small holes 103 in an injection molding process. However, no plastic magnetic material is filled in the through hole 104 in which bearings 36 will be placed. The yoke 38 can now be securely be fixed to the rotor assembly without the use of any screw or adhesive.

In a step (d1), eight mirrors 105 are formed around the entire outer side surface of the blank 100 in a high-speed cutting process with reference to the upper reference surface.

Subsequently, the two bearings 36 are fitted in the hole 104 in a step (e1), thus completing the rotor assembly.

The second process will be described below.

In a step (c2), an annular yoke plate 38 is inserted in the cavity 101 and held against the bottom thereof with small holes in the yoke plate 38 being held in registry with the holes 103, respectively. Thereafter, a plastic magnetic material with magnetic powder mixed therein is filled in the cavity 101, the shallow recess 102, and the small holes 103 in an injection molding process. However, no plastic magnetic material is filled in the through hole 105 in which a shaft will be placed. The yoke 38 can now securely be fixed to the rotor assembly without the use of any screw or adhesive.

In a step (d2), eight mirrors 105 are formed around the entire outer side surface of the blank 100 in a high-speed cutting process with reference to the upper reference surface.

Subsequently, a shaft is fitted in the hole 105, thereby completing the rotor assembly.

The plastic magnetic material may be secured to the rotor assembly in various other means, described below, than the holes 37e of the rotor assembly 37 in which the plastic magnetic material is filled.

Figure 21:
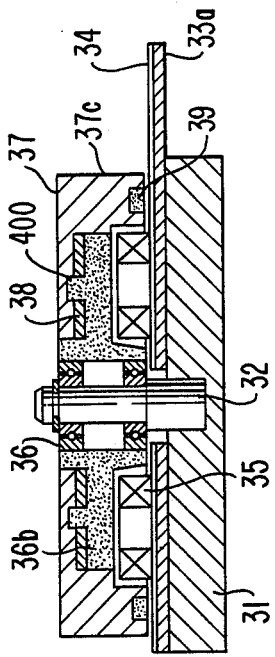
FIGS. 19 through 22 are axial cross-sectional views of laser scanning motors according to other embodiments of the present invention.
Figure 22:
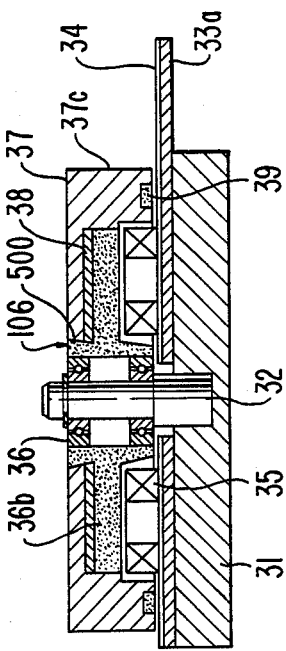
Figure 19:
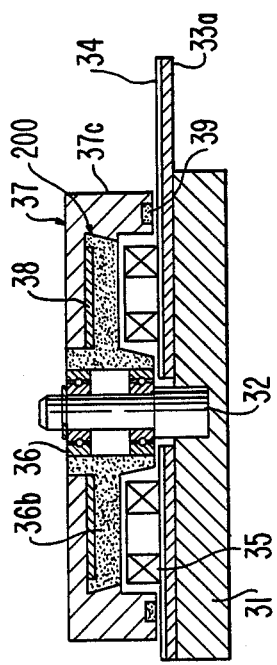
Figure 20:
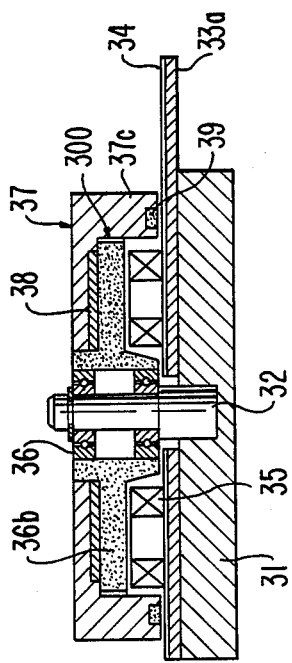

FIG. 19 shows an undercut portion 200 in the upper periphery of the cavity 101 defined in the rotor assembly 37. FIG. 20 shows a knurled portion 300 in the outer periphery of the cavity 101. FIG. 21 illustrates blind holes 400 which are defined in the rotor assembly 37 but do not reach the upper surface thereof. Alternatively, an undercut portion 500 is defined around the through hole 106, as shown in FIG. 22. When a plastic magnetic material is injection-molded, it is filled in the material retaining portion such as the undercut portion 200 or 500, the knurled portion 300, or the holes 400 to secure the member formed by the plastic magnetic material firmly to the rotor assembly.

According to the first process described above, motor poles for rotating mirrors and a shaft inserting member are simultaneously formed on a disc-shaped metallic blank. Therefore, the rotor assembly can easily be manufactured. Furthermore, since the plastic magnetic material is filled in the material retaining portion, the member formed by the plastic magnetic material is securely attached to the rotor assembly without the aid of any fasteners.

In the second process described above, magnetic poles for detecting the speed of rotation of the rotor assembly can also be formed in the injection-molding process, resulting in a simplified manufacturing method.

Although certain preferred embodiments have been shown and described, it should be understood that many changes and modifications may be made therein without departing from the scope of the appended claims.

What we claim is:

1. A laser scanning motor having a rotatable polygonal outer mirror for deflecting a light beam incident thereon, said laser scanning motor comprising:
   a rotor assembly including a main portion supporting on a side thereof the rotatable mirror for deflecting said light beam;
   a brushless motor having poles made of a plastic magnetic material and mounted in said main portion; and
   a rotor yoke coupled between said main portion and said poles of said plastic magnetic material.

2. A laser scanning motor according to claim 1 wherein said main portion is made of a nonmagnetic material.

3. A laser scanning motor having a rotatable polygonal outer mirror for deflecting a light beam incident thereon, said laser scanning motor comprising:
   a rotor assembly including a main portion supporting on a side thereof the rotatable mirror for deflecting said light beam;
   stator coils;
   rotor magnetic poles of a permanent magnet made of a plastic magnetic material and mounted in said main portion in a confronting relation to said stator coils; and
   a bearing made of a plastic magnetic material and joined centrally to said magnetic poles in said main portion.

4. A laser scanning motor having a rotatable polygonal outer mirror for deflecting light beams incident thereon, said laser scanning motor comprising:
   a base;
   a rotor assembly rotatably supported on said base and including a main portion supporting on a side thereof the rotatable mirror for deflecting said light beams, said rotor assembly having an axially defined doughnut-shaped cavity;
   rotor magnetic poles made of a plastic magnetic material and disposed on a side wall of said cavity with a rotor yoke therebetween;
   stator coils dispersed in said cavity in confronting relation to said rotor magnetic poles; and a cup-shaped coil yoke having a bottom surface secured to said base and disposed in confronting relation to said rotor magnetic poles having said stator coils disposed therebetween.

5. A method of manufacturing a laser scanning motor having a rotatable mirror for deflecting a light beam incident thereon, said method comprising the steps of:
   (a) defining a cavity in a disc-shaped metallic blank for receiving a field magnet, a central through hole in the blank for receiving a bearing holder, and a material retaining portion in the blank for a material of the field magnet;
   (b) filling a plastic magnetic material in the cavity, an outer circumferential portion of the central through hole, and the material retaining portion, a cylindrical portion positioned outside of a center of the central through hole and cavity, while forming a bearing holder centrally in the central through hole and cavity which has a diameter smaller than that of the central through hole; and
   (c) subsequently, forming the mirror on a side of the blank.

6. A method according to claim 5, wherein said step (a) of forming the material retaining portion includes a step of forming a through hole of an inverted conical shape extending from the cavity to a surface of the blank.

7. A method according to claim 5, wherein said step (a) of forming the material retaining portion includes a step of forming a through hole of an inverted conical shape extending from the cavity and terminating short of a surface of the blank.

8. A method according to claim 5, wherein said step (a) of forming the material retaining portion includes a step of forming an undercut portion in an upper outer periphery of the cavity.

9. A method according to claim 5, wherein said step (a) of forming the material retaining portion includes a step of forming a knurled portion in an outer periphery of the cavity.

10. A method according to claim 5, wherein said step (a) of forming the material retaining portion includes a step of forming an undercut portion in the central through hole.

11. A method according to claim 5, wherein said step (b) includes forming the bearing holder centrally in the blank and forming a through hole for inserting therein a bearing which supports a shaft.

12. A method according to claim 5, further comprising a step of supporting a shaft in the bearing holder.

13. A method of manufacturing a laser scanning motor having a rotatable mirror for deflecting a light beam incident thereon, said method comprising the steps of:
   (a) defining a cavity in a disc-shaped metallic blank for receiving a field magnet, the cavity and metallic blank having the same axis, an annular recess extending outwardly from the cavity for receiving poles for detecting the position of a rotor assembly, a central through hole in the blank for receiving a bearing holder, and a material retaining portion in the blank for receiving a material of the field magnet;
   (b) filling a plastic magnetic material in the cavity, the annular recess, an outer circumferential portion of the central through hole, and the material retaining portion, a cylindrical part positioned outside a center of the central through hole and cavity, while forming a bearing holder centrally in the central through hole and cavity, the bearing holder having a diameter smaller than the central through hole; and (c) forming the mirror on a side of the blank.

14. A method according to claim 13, wherein said step (a) of forming the material retaining portion comprises forming a through hole of an inverted conical shape extending from the cavity to a surface of the blank.

15. A method according to claim 13, wherein said step (a) of forming the material retaining portion comprises forming a through hole of an inverted conical shape extending from the cavity and terminating short of a surface of the blank.

16. A method according to claim 13, wherein said step (a) of forming the material retaining portion comprises forming an undercut portion in an upper outer periphery of the cavity.

17. A method according to claim 13, wherein said step (a) of forming the material retaining portion comprises forming a knurled portion in an outer periphery of the cavity.

18. A method according to claim 7, wherein said step (a) of forming the material retaining portion comprises forming an undercut portion in the central through hole.

19. A method according to claim 8, wherein said step (a) comprises forming the bearing holder centrally in the blank and forming a through hole for inserting therein a bearing which supports a shaft.

20. A method according to claim 9, further comprising a step of forming a shaft supported in the bearing holder.

* * * * *

UNITED STATES PATENT AND TRADEMARK OFFICE
CERTIFICATE OF CORRECTION

PATENT NO. : 4,836,631
DATED : JUNE 6, 1989
INVENTOR(S) : KIKUO SHIMAZU ET AL.

It is certified that error appears in the above-identified patent and that said Letters Patent is hereby corrected as shown below:

Col. 4, line 62, "iintegrally" should be --integrally--.

Col. 7, line 31, "magnet" should be --magnetic--;
      line 66, "magnet" should be --magnetic--.

Col. 10, line 5, "forcefitted" should be --force-fitted--;
      line 40, "magnet" should be --magnetic--;
      line 68, "such soft" should be --such as soft--.

Col. 11, line 19, "such soft" should be --such as soft--;
      line 39, "15, a" should be --15, an--.

Col. 13, line 39, "claim 1" should be --claim 1,--.

Col. 14, line 2, after "and" start a new paragraph, with paragraph indentation, beginning with "a cup-".

Col. 16, line 7, "claim 7," should be --claim 13,--;
      line 11, "claim 8," should be --claim 13,--;
      line 15, "claim 9," should be --claim 13,--.

Signed and Sealed this

Third Day of April, 1990

*Attest:*

HARRY F. MANBECK, JR.

*Attesting Officer*      *Commissioner of Patents and Trademarks*